US008976790B2

(12) United States Patent
Hall et al.

(10) Patent No.: US 8,976,790 B2
(45) Date of Patent: Mar. 10, 2015

(54) DISJOINT DATA PATH ROUTING FOR INTEGRITY AND AVAILABILITY AUGMENTATION

(75) Inventors: Brendan Hall, Eden Praire, MN (US); Kevin R. Driscoll, Maple Grove, MN (US); Srivatsan Varadarajan, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 361 days.

(21) Appl. No.: 13/566,685

(22) Filed: Aug. 3, 2012

(65) Prior Publication Data
US 2014/0036735 A1    Feb. 6, 2014

(51) Int. Cl.
*H04L 12/28*     (2006.01)

(52) U.S. Cl.
USPC ........................................... 370/392; 370/400

(58) Field of Classification Search
CPC ......... H04L 45/02; H04L 45/22; H04L 45/16; H04L 45/28; H04W 84/18; H04W 40/00
See application file for complete search history.

(56) References Cited

U.S. PATENT DOCUMENTS

| 5,161,186 | A | 11/1992 | Dolev et al. |
| 5,659,781 | A | 8/1997 | Larson |
| 5,822,299 | A | 10/1998 | Goodman |
| 6,097,696 | A * | 8/2000 | Doverspike ................... 370/216 |
| 6,456,588 | B1 | 9/2002 | Simmons |
| 6,542,469 | B1 * | 4/2003 | Kelley et al. ................. 370/238 |
| 6,804,199 | B1 | 10/2004 | Kelly et al. |
| 7,372,859 | B2 | 5/2008 | Hall et al. |
| 7,426,179 | B1 * | 9/2008 | Harshavardhana et al. .. 370/219 |
| 7,496,096 | B1 | 2/2009 | Dong et al. |
| 7,606,140 | B2 | 10/2009 | Golla |
| 7,656,881 | B2 | 2/2010 | Hall et al. |
| 7,796,503 | B2 | 9/2010 | Hamada et al. |
| 7,912,094 | B2 * | 3/2011 | Hall et al. ..................... 370/508 |
| 8,130,773 | B2 | 3/2012 | Hall et al. |
| 8,144,626 | B2 | 3/2012 | Zhang et al. |
| 2001/0032271 | A1 | 10/2001 | Allen |
| 2004/0029553 | A1 * | 2/2004 | Cain ............................ 455/403 |

(Continued)

FOREIGN PATENT DOCUMENTS

WO     2010149562     12/2010

OTHER PUBLICATIONS

Challal et al, "Secure and efficient disjoint multipath construction for fault talerant routing in wireless sensor networks", "Journal of Network and Computer Applications ", Jan. 2011, pp. 1-49, vol. 34.

(Continued)

*Primary Examiner* — Jung Park
(74) *Attorney, Agent, or Firm* — Fogg & Powers LLC (57) ABSTRACT

A method comprises transmitting a plurality of copies of a message from each of a first transmission node and a second transmission node, each copy having a respective identification and forwarding each of the plurality of copies of the message among other nodes in the network based, at least in part, on the respective identification of each copy such that each copy of the message traverses a predetermined communication path among the other nodes. A respective first received copy is compared to a respective second received copy at each of the other nodes. The integrity of the respective first and second copies is validated at each of the other nodes if the copies match and the copies traversed disjoint communication paths.

19 Claims, 5 Drawing Sheets

(56) References Cited

U.S. PATENT DOCUMENTS

2006/0200580 A1 9/2006 Wool
2010/0329120 A1 12/2010 Zhang et al.
2014/0068105 A1* 3/2014 Thubert et al. ............... 709/239

OTHER PUBLICATIONS

Chaudhari et al, "Comparative Study of Multipath-Based Routing Techniques for Wireless Sensor Network", "International Conference on Computer Communication and Networks CSI-COMNET-2011", Jul. 2011, pp. 50-53.

De et al., "Meshed multipath routing with selective forwarding: an efficient strategy in wireless sensor networks", "Computer Networks", Sep. 2003, pp. 481-497, vol. 43, No. 1.

Fokum et al, "A Secure Routing Protocol for SensorNet", "Seventh IASTED International Conference on Wireless and Optical", May 2007.

Ganesan et al., "Highly-Resilient, Energy-Efficient Multipath Routing in Wireless Sensor Networks", "Mobile Computing and Communications Review", Jul. 1997, pp. 1-13, vol. 1, No. 2.

Hall et al., "Ringing Out Fault Tolerance a New Ring Network for Superior Low-Cost Dependabilitiy", "International Conference on Dependable Systems and Networks (DSN'05)", 2005, pp. 298-307.

Meghanathan, "A node-disjoint multi-path routing protocol based on location prediction for mobile ad hoc networks", "International Journal of Engineering, Science and Technology", Apr. 2010, pp. 66-80, vol. 2, No. 5.

Papadimitratos et al., "Secure message transmission in mobile ad hoc networks", "Ad Hoc Networks", Jul. 2003, pp. 193-209, vol. 1, No. 1.

* cited by examiner

DISJOINT DATA PATH ROUTING FOR INTEGRITY AND AVAILABILITY AUGMENTATION

BACKGROUND

In typical safety relevant networks data integrity and availability need to be guaranteed. In conventional safety relevant systems data availability is achieved by replicating switching paths, which often leads to significant switching component overhead. Data integrity is often achieved using end to end computed integrity codes calculated by additional software layers (normally termed safety layers) that augment integrity via elaborate CRC and time stamping schemes. However, the software complexity of these schemes can quickly grow. The end-to-end coverage is also limited by the line-encoding coverage, e.g. the CRC code used to protect messages as the messages propagate on the network medium. Such CRC codes have been shown to leak.

SUMMARY

In one embodiment, a method of communicating data in a network is provided. The method comprises transmitting a plurality of copies of a message from each of a first transmission node and a second transmission node, each copy having a respective identification; and forwarding each of the plurality of copies of the message among other nodes in the network based, at least in part, on the respective identification of each copy such that each copy of the message traverses a predetermined communication path among the other nodes. The method also comprises comparing, at each of the other nodes, a respective first received copy of the message transmitted from the first transmission node to a respective second received copy of the message transmitted from the second transmission node. The method also comprises validating, at each of the other nodes, the integrity of the respective first and second received copies if the respective first received copy of the message matches the respective second received copy of the message and the respective first received copy traverses a communication path that is disjoint from a communication path traversed by the respective second transmission node.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below use routing tables, such as Ethernet routing tables, to map and constrain data propagation flows through a network, based on the network topology, such that the receiving nodes are able to qualify the correctness of the data (validate the data integrity) based on a priori knowledge of the topology and data flows or paths of the received data. The embodiments also implement a transmission pair that is configured to ensure consistent correct data broadcast from the transmission pair.

The routing tables for each node are configured to ensure sufficient redundancies of the routing paths provide enough availability of the messages to tolerate two faults and to ensure correctness/integrity of data through disjoint paths. Each node compares received messages through logical ANDs of messages from distinct sources and/or receiving messages through disjoint paths and enough redundancies for tolerating 2 faults through logical ORing of sets of messages.

The embodiments described below also provide an additional pair-wise exchange at reception which augments availability of the message to a receiving pair of nodes (e.g. in scenarios of partitioned broadcast from source) through the additional pair-wise exchange as described below. As used herein, a given node transmits a message when it is the source of the message. Additionally, as used herein, a given node forwards a message when it communicates a message that was received from another source node.

Figure 1A:
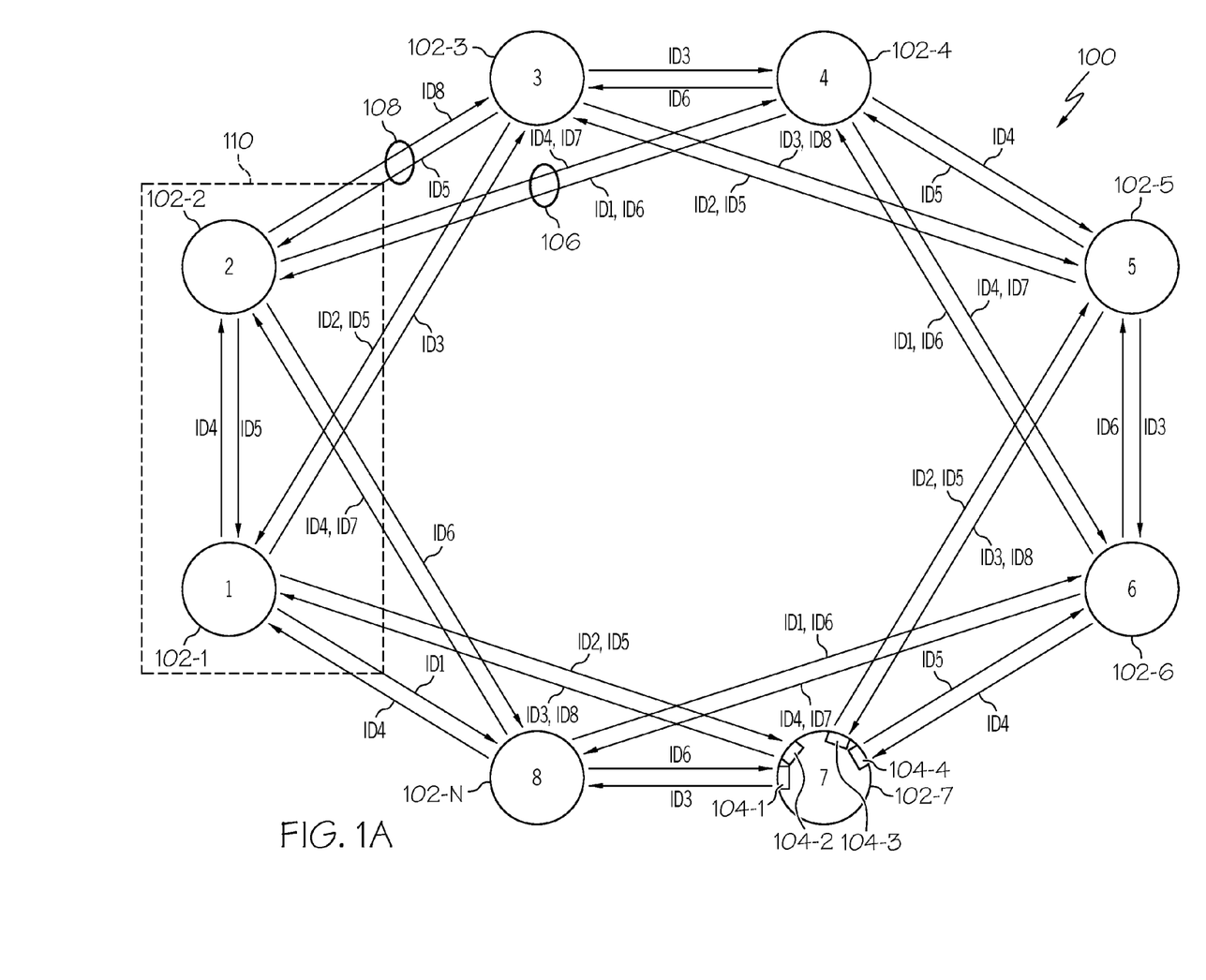
FIGS. 1A-1C are high level block diagrams of one embodiment of an exemplary network.

FIG. 1 is a high level block diagram of one embodiment of an exemplary communication network 100. Communication network 100 includes a plurality of nodes 102-1 . . . 102-N. The nodes of FIG. 1 are also individually referenced herein as node 1 through node 8. Although eight nodes are shown in FIG. 1, it is to be understood that any number of nodes can be used in other embodiments. Additionally, in this embodiment, each of the nodes 102 is coupled to each of its immediate or adjacent neighbors (also referred to herein as "direct neighbors", "adjacent nodes", or "neighbor nodes") via respective direct links 108 and to each of its direct neighbor's neighbor (also referred to herein as "skip neighbors", "skip nodes", or "neighbor's neighbor nodes") via respective skip links 106. Thus, each node 102 in the exemplary network 100 has two "neighbor" nodes 102, one in the clockwise direction (also referred to here as the "clockwise neighbor node" or "clockwise neighbor") and one in the counter-clockwise direction (also referred to here as the "counter-clockwise neighbor node" or "counter-clockwise neighbor"). For example, the neighbor nodes 102 for node 1 are node 2 in the clockwise direction and node 8 in the counter-clockwise direction. In addition, each node 102 has two neighbor's neighbor nodes 102, in this example, one in the clockwise direction (also referred to here as the "clockwise neighbor's neighbor node" or "clockwise neighbor's neighbor") and one in the counter-clockwise direction (also referred to here as the "counter-clockwise neighbor's neighbor node" or "counter-clockwise neighbor's neighbor"). For example, the two neighbor's neighbor nodes for node 1 are node 3 in the clockwise direction and node 7 in the counter-clockwise direction.

Hence, in the particular embodiment shown in FIG. 1, the nodes 102 are arranged in a ring having a "braided ring" topology in which the nodes 102 communicate with one another over skip links 106 and direct links 108 as described above. However, it is to be understood that in other embodiments, a different number and/or type of nodes 102 and/or channels 110/112 and/or a different network topology are used. For example, in some embodiments, a mesh network is implemented and in another embodiment a ring network having a central hub or switch coupled to each of the nodes is implemented.

For the sake of illustration, the details of nodes 102 are not shown in FIG. 1. However, it is understood that the nodes 102 are implemented using suitable hardware and/or software to implement the functionality described here as being performed by the nodes 102. Each such node 102 also includes a suitable network or other interface for communicatively coupling that node to the links 108 and 106. Examples of suitable node implementations are described in the U.S. Pat. No. 7,606,179 and the U.S. Pat. No. 7,372,859, both of which are incorporated herein by reference in their entirety, though it is to be understood that the nodes 102 can be implemented other ways.

In this example, each of the nodes 102 communicates over the links 106 and 108 using an Ethernet-based protocol, such as Ethernet POWERLINK, EtherCAT, and Time-triggered (TT) Ethernet. Discussion of Ethernet-based protocols herein refers to implementations of one or more of the family of IEEE 802.3 family of standards, such as 1000BASE-T Ethernet or 100BASE-X Ethernet. In addition, EtherCAT, as used herein, also refers to an implementation of the specification published as IEC/PAS 62407. Similarly, Ethernet POWERLINK refers to an implementation of the protocol standard managed by the Ethernet POWERLINK Standardization Group.

Additionally, embodiments of network 100 are implemented using various media access schemes. For example, the embodiment shown in FIG. 1 is described herein as being implemented using time division multiple access (TDMA) media access scheme (for example, the media access scheme implemented in the TTP/C or FLEXRAY protocols). In other embodiments, other media access schemes are used.

Figure 2:
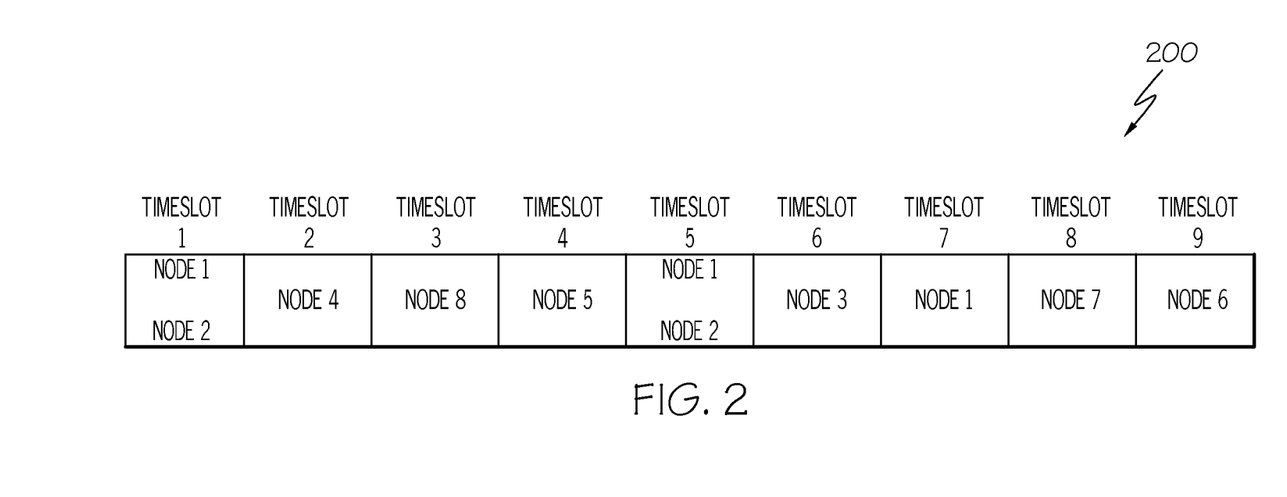
FIG. 2 depicts an exemplary TDMA schedule.

In embodiments implementing a TDMA media access scheme, a TDMA schedule is used to determine when the nodes 102 are to transmit data. In particular, during a given schedule period, various nodes 102 in the network 100 are assigned a respective time slot in which to transmit. In other words, for any given time slot, the node 102 assigned to that time slot is allowed to transmit during that time slot (also referred to herein as the "scheduled node" 102). An exemplary TDMA schedule 200 is shown in FIG. 2.

As shown in the exemplary TDMA schedule 200, timeslot 1 and timeslot 5 are assigned to both node 1 and node 2. Thus, as determined by the schedule 200, node 1 and node 2 transmit as a transmission pair 110. That is, nodes 1 and 2 agree on the data to be transmitted to the other nodes. For example, nodes 1 and 2, when scheduled to transmit as a transmission pair, can exchange data via the direct links 108 coupling nodes 1 and 2 together. Each of nodes 1 and 2 then compares the data received from the other node in the transmission pair 110. If the data matches, each of nodes 1 and 2 transmits the data to other nodes (also referred to herein as receiving nodes) in the network 100. Additional details regarding operation of a transmission pair (also referred to as a self-checking pair) are described in U.S. Pat. No. 7,372,859, which is incorporated herein by reference.

Notably, as shown in the TDMA schedule, in some embodiments, the nodes 1 and 2 are scheduled to transmit as a transmission pair 110 in some time slots and to transmit individually in other time slots. In addition, other pairs of nodes can be scheduled to transmit as a transmission pair during other timeslots.

Additionally, when scheduled to transmit as a transmission pair 110, each of nodes 1 and 2 transmits multiple copies of the agreed upon data (also referred to herein as a 'message' or 'frame') from the transmission pair 110 to the other nodes. As used herein, when a link 106/108 is described as being connected 'from' a first node 102 'to' a second node 102, the link 108 provides a communication path for the first node 102 to send data to the second node 102 over the link 106/108. That is, the direction of that link 106/108 is from the first node 102 to the second node 102. The direct links 108 and skip links 106 can be implemented using full-duplex bi-directional links or half-duplex bidirectional links.

The braided ring topology of the network 100 enables multiple communication paths between any two given nodes. That is, by selective routing of messages or frames over the links 106 and 108, multiple communication paths are formed between any two given nodes. The transmission nodes of a transmission pair, nodes 1 and 2 in this example, insert a unique identification (ID) in each copy of the message transmitted. For example, in some embodiments implementing an Ethernet protocol, the unique ID is one or more bits of an Ethernet destination address. Additionally, in some embodiments implementing Avionics Full-Duplex Switched Ethernet (AFDX), the unique ID is at least a portion of the virtual link ID. However, it is to be understood that the unique ID can be implemented differently in other embodiments.

Each of the nodes 102 is configured to selectively route received messages based on the respective unique ID. In particular, the messages are routed such that at least one copy of the message from one of the transmission nodes in the transmission pair 110 travels an independent or disjoint communication path from a copy of the message from the other transmission node in the transmission pair 110. As used herein, independent or disjoint communication paths are paths that do not share a common node or link with one another. The routing scheme or rules is determined a priori based on knowledge of the network topology. Table 1 below depicts the multiple communication paths for the example of FIG. 1. However, it is to be understood that other routing schemes can be implemented in other embodiments. In Table 1 and in FIG. 1, the label ID1 refers to a first copy of the message with a first unique ID, the label ID2 refers to a second copy of the message with a second unique ID, etc.

TABLE 1

|  | Node 3 | Node 4 | Node 5 | Node 6 | Node 7 | Node 8 |
| --- | --- | --- | --- | --- | --- | --- |
| ID1 |  | 1→8→6→4 |  | 1→8→6 |  | 1→8 |
| ID2 | 1→7→5→3 |  | 1→7→5 |  | 1→7 |  |
| ID3 | 1→3 | 1→3→4 | 1→3→5 | 1→3→5→6 | 1→3→5→7 | 1→3→5 →7→8 |
| ID4 |  | 1→2→4 | 1→2→4→5 | 1→2→4→6 | 1→2→4 →6→7 | 1→2→4 →6→8 |
| ID5 | 2→1→7 →5→3 | 2→1→7 →5→4 | 2→1→7→5 | 2→1→7→6 | 2→1→7 |  |

TABLE 1-continued

| | Node 3 | Node 4 | Node 5 | Node 6 | Node 7 | Node 8 |
|---|---|---|---|---|---|---|
| ID6 | 2→8→6→4→3 | 2→8→6→4 | 2→8→6→5 | 2→8→6 | 2→8→7 | 2→8 |
| ID7 | | 2→4 | | 2→4→6 | | 2→4→6→8 |
| ID8 | 2→3 | | 2→3→5 | | 2→3→5→7 | |

As shown in Table 1, ID1 and ID7 travel independent or disjoint communication paths to arrive at node 4 from the transmission pair 110. In particular, ID1 arrives at node 4 via nodes 8 and 6, whereas, ID7 arrives at node 4 directly from node 2. Similarly, ID3 travels a path to node 4 that is disjoint from the communication path of ID7. However, ID1 and ID6 do not travel disjoint paths as both arrive at node 4 via nodes 8 and 6. Thus, a portion of the respective communication paths of ID1 and ID6 overlap. A similar arrangement exists for each of the nodes 3 through 8. That is, at least one of the messages transmitted from node 1 (e.g. ID1 through ID4 in this example) travels a path that is disjoint from a message transmitted from node 2 (e.g. ID5 through ID6 in this example). Notably, the communication paths depicted in Table 1 are provided by way of example and that other communication paths can be configured in other embodiments and/or for other transmission pairs.

Based on the a priori knowledge of the routing scheme and network topology, each receiving node (e.g. a node that is not a member of the transmission pair) is configured with individual acceptance criteria for accepting a message as having high integrity. As used herein, a message having 'high integrity' means that the message has been validated to be the same as the message originally transmitted from the transmission pair. In other words, the receiving node can trust that the content of the received message is the same content that was transmitted from the transmission pair. Exemplary acceptance criteria for the example of FIG. 1 are shown below in Table 2.

In addition, in some embodiments, the messages are compared field-by-field. In particular, each message is divided into a priori known fields. For example, each node can be configured to use a first predetermined number of bytes as a header, another predetermined number of bytes after that as payload, etc. It is to be understood that the number and size of fields used vary based on the specific implementation. Each field of one copy of the message is compared to a corresponding field of another copy of the message. In addition, the comparison function for each field can be different from other fields of the message. For example, one field can be compared using a bit-for-bit exact comparison whereas another field can be compared using a bounded comparison with a configured tolerance value. In addition, the tolerance value for each field compared with a bounded comparison can vary from field to field.

Additionally, in Table 2, the symbol '|' is used to denote an alternative (e.g. OR operation). For example, (ID2&ID6)|(ID3&ID8) means that either ID2 matches ID6 or ID3 matches ID8. Thus, nodes 3 through 8 can accept the message as having high integrity if any of the respective 4 alternative conditions shown in Table 2 exist. In addition, the acceptance criteria for some of the nodes include an alternative condition in which 3 separate copies of the message are compared. For example, node 4 is configured to accept the message as having high integrity if ID1 matches ID5 and ID6. As discussed above, the comparison can be a bit-for-bit exact comparison or a bounded comparison with a configured tolerance value.

TABLE 2

| Node 3 | Node 4 | Node 5 | Node 6 | Node 7 | Node 8 |
|---|---|---|---|---|---|
| (ID2&ID6)| | (ID1&ID5&ID6)| | (ID2&ID6)| | (ID1&ID5&ID6)| | (ID2&ID6)| | (ID1&ID6)| |
| (ID3&ID8)| | (ID3&ID7)| | (ID3&ID4&ID8)| | (ID3&ID7)| | (ID3&ID4&ID8)| | (ID3&ID7)| |
| (ID2&ID8)| | (ID1&ID7)| | (ID2&ID8)| | (ID1&ID7)| | (ID2&ID8)| | (ID1&ID7)| |
| (ID3&ID6) | (ID3&ID5&ID6) | (ID3&ID4&ID6) | (ID3&ID5&ID6) | (ID3&ID4&ID6) | (ID3&ID6) |

In Table 2, the '&' symbol is used to denote a configured comparison function. In some embodiments, the comparison function is implemented as an AND operation in which the messages must match exactly. For example, ID2&ID6 means that ID2 matches ID6 bit-for-bit in such an AND operation. In other embodiments, the comparison function is a bounded comparison with respect to a configurable tolerance value. In other words, if the aggregate difference between the two messages is less than a configured tolerance value, the messages are accepted as matching or agreeing. Thus, as used herein, the term "match" is defined to mean either being bit-for-fit identical or any differences between the two messages are within a configured tolerance level. The use of a bounded comparison with a configurable tolerance value enables the use of dissimilar CPUs in the nodes. The nodes are configured a priori to use the same default message if the two messages differ, but the difference is smaller than the configured tolerance value.

As shown in Table 2, ID1 and ID5 do not travel disjoint paths since both arrive at node 4 via node 1. Similarly, ID1 and ID6 do not travel disjoint paths since both arrive at node 4 via nodes 8 and 6. However, ID5 and ID6, which both originate from node 2, travel different paths from node 2 to node 4. Thus, the respective communication paths of ID1, ID5, and ID6 do not share the same common node. Thus, if ID1 matches both ID5 and ID6, node 4 is able to validate or accept the message as having high integrity.

Furthermore, although each message is described above as having a unique ID, for purposed of explanation, it is to be understood that a unique ID for each message is not required in other embodiments. For example, in some embodiments, node 1 inserts the same ID into each copy of the message that originates at node 1. Similarly, node 2 inserts the same ID into each copy of the message that originates at node 2. Alternatively node 1 could insert a first ID in each copy of the message output in a first direction and a second ID in each copy of the message output in a second direction. Similarly, in such alternative embodiments, node 2 inserts a third ID in each copy of the message output in the first direction and a fourth ID in each copy of the message output in the second direction.

In embodiments where each message does not have a unique ID, the nodes of the network 100 are configured to route or forward received copies of the message based on a combination of the message ID and the physical port over which the copy of the message was received. For example, each node 102 in the exemplary network 100 has 4 ports 104-1 . . . 104-4 (also referred to herein as ports 1 . . . 4, respectively) as depicted in node 7. Notably, only the ports for node 7 have been shown for purposes of explanation. However, it is to be understood that each of the nodes has similar ports. Additionally, the number of ports used can vary based on the specific implementation. Each port 104 is configured to receive and transmit messages from/to another node. For example, port 104-1 (port 1) in node 7 enables bi-directional communication with node 8 (the clockwise neighbor node of node 7). Port 104-2 (port 2) enables bi-directional communication with node 1 (the clockwise neighbor's neighbor node of node 7). Port 104-3 (port 3) enables bi-directional communication with node 5 (the counter-clockwise neighbor's neighbor node of node 7) and port 104-4 (port 4) enables bi-directional communication with node 6 (the counter-clockwise neighbor node of node 7).

Figure 1B:
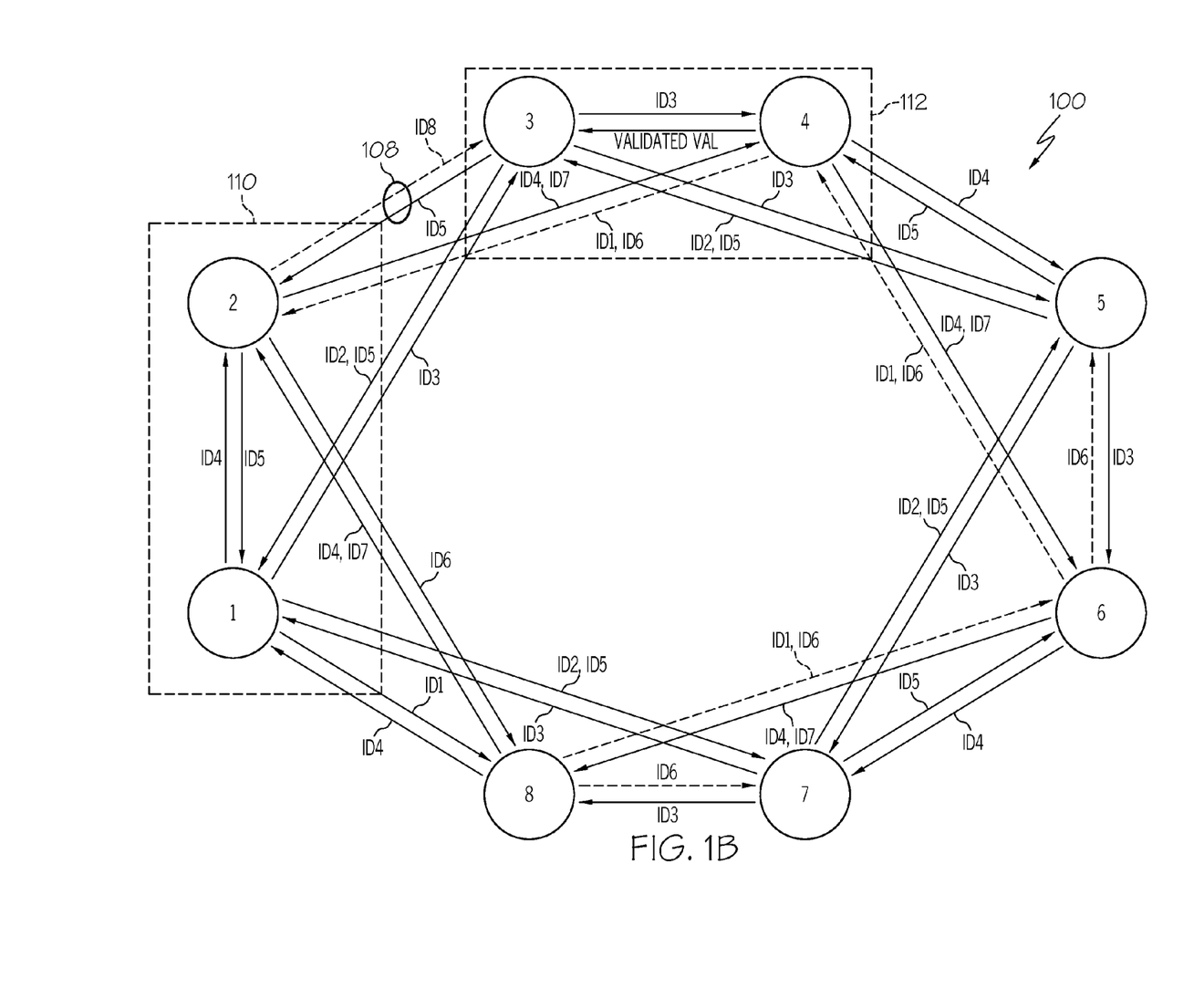
Figure 1C:
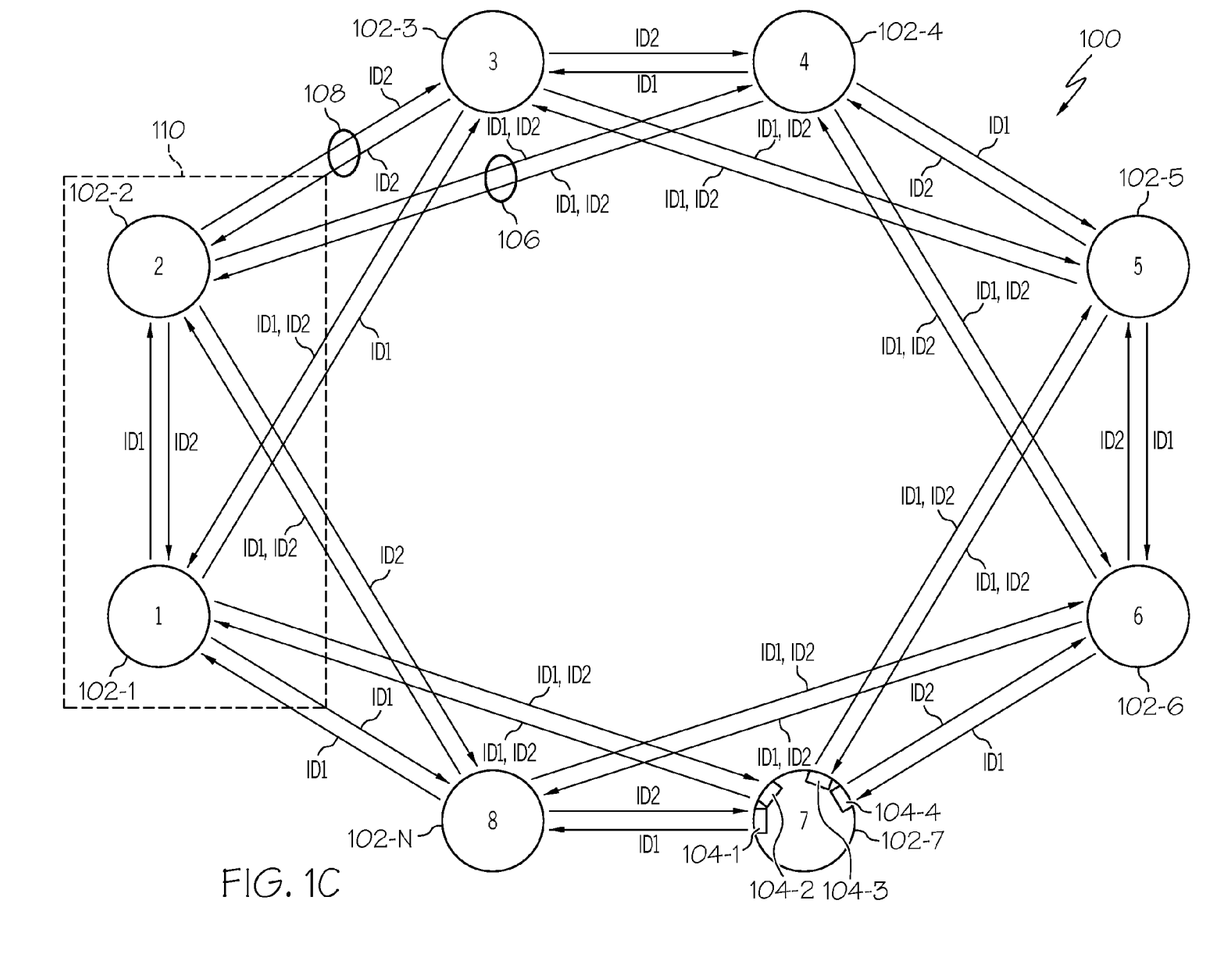

As stated above, when each copy of a message from the transmission pair 110 does not have a unique ID, as shown in FIG. 1C, each node 102 is configured to forward received copies of the message based on the port over which the message was received and on the message ID. For example, Table 3 is an exemplary routing table for node 7. Similar routing rules can be determined for each of the other exemplary nodes.

TABLE 3

|     | Port 1          | Port 2         | Port 3        | Port 4         |
| --- | --------------- | -------------- | ------------- | -------------- |
| ID1 | N/A             | Port 3         | Port 1, Port 2 | Do not forward |
| ID2 | Do not forward  | Port 3, Port 4 | Port 2        | N/A            |

As can be seen in Table 3, if node 7 receives a message copy having message ID1 on port 2, it forwards the message copy on port 3. If node 7 receives message ID1 on port 3, it forwards the message copy on both ports 1 and 2. If node 7 receives message ID1 on port 4, it does not forward the message copy. Since the routing paths are pre-configured and node 7 does not receive message ID1 on port 1, no forwarding rule is configured for that situation. For example, if an error occurred that resulted in a message ID1 being received on port 1 of node 7, node 7 would discard the message as being an error, in some embodiments. Similar forwarding rules are also configured for message ID2 received at node 7. Hence, through the use of a combination of port number and message ID, disjoint communication paths can be configured for the copies of the message being propagated around the network 100.

In addition, since the communication path for the copies of the message are pre-configured to include disjoint communication paths to each node 102, the combination of the port number and message ID can be used for the acceptance criteria as well. For example, in the embodiment above using two message IDs, node 7 can be configured to accept the message as having high integrity under the following conditions: (ID1 on port 2)&(ID2 on port 1) or (ID1 on port 3)& (ID1 on port 4)&(ID2 on port 3) or (ID1 on port 2)&(ID2 on port 3) or (ID1 on port 3)&(ID1 on port 4)&(ID2 on port 1).

During operation, faults may occur which prevent the reception of some of the messages at one or more of the nodes 102. Such faults can be due to faulty nodes which transmit or forward erroneous messages or do not transmit/forward a message at all. Additionally, noise or other line problems on links 106 and 108 can cause a message to be received with errors or not received at all.

FIG. 1B depicts an exemplary scenario in which both nodes 2 and 8 are at least partially faulty. In particular, node 2 fails to transmit ID8. Similarly, node 8 does not forward ID1 or ID6. As a result, some of the nodes are unable to validate the integrity of the received messages based on the predetermined acceptance criteria. For example, node 3 does not receive either ID6 or ID8 and, thus, none of the predetermined acceptance criteria can be met. However, each of the nodes is configured to form a reception pair with an adjacent or neighbor node with which a pair-wise exchange can be performed to validate the integrity of the received messages in such an event. For example, node 3 is configured to form a reception pair 112 with node 4. Although node 3 is unable to validate the integrity of the received message, node 4 receives both ID7 and ID3 and, thus, is able to validate the integrity of its received messages. Node 4 provides the validated or accepted message to node 3 over the direct link 108 that couples nodes 3 and 4. Node 3 compares the validated value from node 4 with a copy of the message received at node 3 (e.g. ID3). If the validated value matches one of the copies received by node 3, then node 3 accepts the message as having high integrity.

Notably, as shown in FIGS. 1A and 1B, each node in this example is configured to forward or transmit only one message on the respective direct links 108. For example, node 7 only forwards ID5 to node 6 and node 6 only forwards ID4 on the respective direct link 108 coupling nodes 6 and 7. In contrast, the nodes 102 can transmit or forward more than one message on the respective skip links 106. For example, node 7 forwards both ID2 and ID5 to node 5 and node 5 forwards both ID3 and ID8 to node 7 on the respective skip link 106 coupling nodes 5 and 7. By only forwarding or transmitting one message on the respective direct links 108, each node 102 is able to perform the pair-wise exchange described above for receiving pairs without the need for additional bandwidth.

Thus, based on the configuration of the selective routing paths for the copies of the message from the transmission pair, each receiving node 102 are able to validate the integrity of received messages using a priori knowledge of the selective routing paths. In addition, the nodes 102 can be implemented using common off the shelf (COTS) components configured to validate the messages since the validation is based on the predetermined selective routing which enables messages from the transmission pair to be received via disjoint paths at the receiving nodes.

Figure 3:
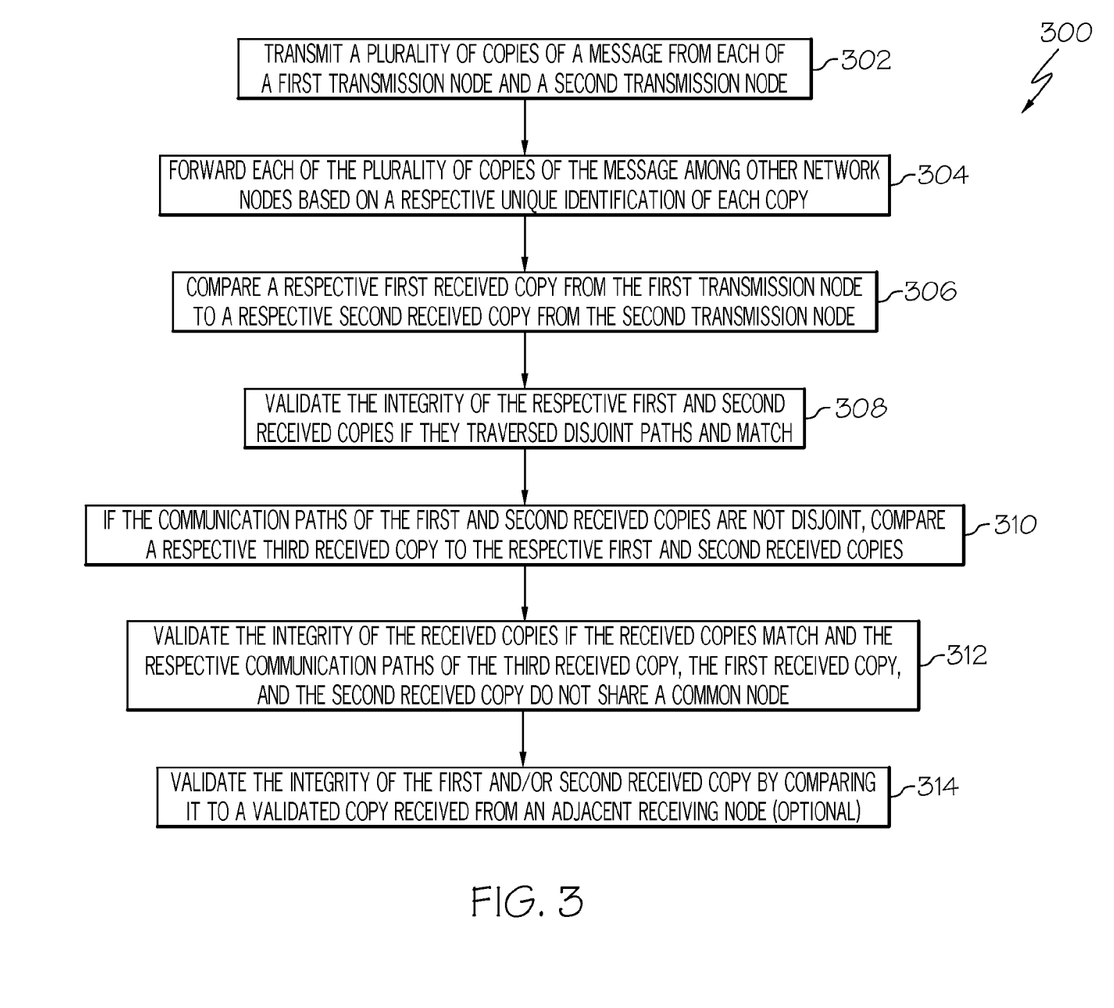
FIG. 3 is a flow chart of one embodiment of a method of communicating data in a network.

FIG. 3 is a flow chart depicting one embodiment of a method 300 of communicating in a network. At block 302, a plurality of copies of a message is transmitted from each of a first transmission node and a second transmission node. Each copy of the message has a respective unique identification, as described above. At block 304, each of the plurality of copies of the message is forwarded among other nodes in the network based on the respective unique identification of each copy. That is, each of the other nodes determines how to forward a received copy of the message based on the unique identification such that each copy of the message traverses a predetermined communication path through the other nodes.

At block 306, a respective first received copy of the message transmitted from the first transmission node is compared, at each of the other nodes, to a respective second received copy of the message transmitted from the second transmission node. That is, each of the other nodes compares a first received copy from the first transmission node to a second received copy from the second transmission node. However, it is to be understood that the first received copy is not required to be the same copy at each of the nodes. In other words, the respective received copy from the first transmission node varies according to the respective node. At block 308, the integrity of the respective first and second received copies is validated at each of the respective other nodes if the respective first received copy of the message matches the respective second received copy of the message and the respective first received copy traverses a communication path that is disjoint from a communication path traversed by the respective second transmission node.

If the communication paths of the first and second received copies are not disjoint, a respective third received copy of the message is compared to the respective first and second received copies of the message at block 310. The respective third received copy of the message is transmitted from one of the first transmitting node or the second transmitting node. At block 312, the integrity of the respective first and second received copies is validated if the respective first and second received copies match the respective third received copy and the respective communication paths of the third received copy, the first received copy, and the second received copy do not share a common node. That is, the communication path of the third received copy can share a common node with each of the first and second received copies individually, but the three communication paths cannot share the same common node.

At block 314, in some embodiments, the receiving nodes are configured to validate the integrity of the first and/or second received copies of the message by comparing it to a validated copy received from an adjacent receiving node. For example, if a node is unable to validate the integrity based on the communication paths of the received copies, it is able to validate the copy if it matches a validated copy received from an adjacent or neighbor node. The adjacent or neighbor node validates the copy based on the communication paths and provides the validated copy to the other node. In other words, an additional paired exchange is performed by adjacent receiving nodes to improve data availability to the pair of adjacent receiving nodes in circumstances where the pair agrees with the message data and at least one node of the pair of nodes validated the integrity or correctness of the data.

Hence, the embodiments described herein implement a predetermined data/message routing and comparison scheme that provide 2-fault tolerance without requiring changes to the underlying protocol framing. In other words, due to the predetermined message routing and comparison scheme, the receiving nodes are able to ensure correctness or integrity of the data using common of the shelf (COTS) networks.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A network comprising:
    a plurality of nodes communicatively coupled to one another via a plurality of communication links;
    wherein the plurality of nodes comprises:
    a transmission pair of nodes comprising a first transmission node and a second transmission node, the first transmission node and the second transmission node configured to agree on a message to be transmitted; and
    a plurality of receiving nodes, wherein each receiving node is communicatively coupled to the first transmission node and the second transmission node via a plurality of communication paths;
    wherein the first transmission node is configured to insert a respective identification into each copy of the message transmitted from the first transmission node;
    wherein the second transmission node is configured to insert a respective identification into each copy of the message transmitted from the second transmission node;
    wherein each of the plurality of nodes is configured to forward received copies of the message to at least one other node of the plurality of nodes;
    wherein each of the plurality of nodes is configured to forward the received copies of the message according to predetermined routing rules based, at least in part, on the respective identification of the received copies of the message such that each receiving node receives at least one copy of the message from the first transmission node and at least one copy of the message from the second transmission node via respective different communication paths;
    wherein each of the receiving nodes is configured to accept the integrity of the message according to respective acceptance criteria, each receiving node's respective acceptance criteria based, at least in part, on the respective communication path of the received copies of the message.

2. The network of claim 1, wherein each receiving node is configured to accept the integrity of the message if a received copy of the message transmitted from the first transmission node matches a received copy of the message transmitted from the second transmission node and the communication path of the copy of the message from the first transmission node is disjoint from the communication path of the copy of the message from the second transmission node.

3. The network of claim 2, wherein each copy of the message comprises a plurality of fields, wherein each receiving node is configured to compare each of the plurality of fields in the copy of the message transmitted from the first transmission node with a corresponding field in the copy of the message transmitted from the second transmission node; wherein the copy of the message transmitted from the first transmission node matches the copy of the message transmitted from the second transmission node if each of the plurality of corresponding fields match.

4. The network of claim 3, wherein a first configured comparison function used for comparing one of the plurality of fields in the copy of the message transmitted from the first transmission node with a corresponding field in the copy of the message transmitted from the second transmission node is different from a second configured comparison function used for comparing another of the plurality of fields in the copy of the message transmitted from the first transmission node with a corresponding field in the copy of the message transmitted from the second transmission node.

5. The network of claim 1, wherein each of the receiving nodes is configured to accept the integrity of the message if:
    three or more received copies of the message match;
    at least one of the three or more received copies originated at the first transmission node;
    at least one of the three or more received copies originated at the second transmission node; and the respective communication paths of the three or more received copies of the message do not all share a common node.

6. The network of claim 1, wherein the plurality of receiving nodes includes one or more reception pairs, each reception pair comprising a first receiving node and a second receiving node;
 wherein if the first receiving node accepts the integrity of the message according to the first receiving node's respective acceptance criteria, the first receiving node is configured to forward a copy of the accepted message to the second receiving node;
 wherein if the second receiving node accepts the integrity of the message according to the second receiving node's respective acceptance criteria, the second receiving node is configured to forward a copy of the accepted message to the first receiving node;
 wherein if the first receiving node is unable to accept the integrity of the message according to the first receiving node's respective acceptance criteria, the first receiving node is configured to compare the accepted message from the second receiving node to a copy of the message received via a node other than the second receiving node and to accept the integrity of the message if the copy of the message received via a node other than the second receiving node matches the accepted message received from the second receiving node; and
 wherein if the second receiving node is unable to accept the integrity of the message according to the second receiving node's respective acceptance criteria, the second receiving node is configured to compare the accepted message from the first receiving node to a copy of the message received via a node other than the first receiving node and to accept the integrity of the message if the copy of the message received via a node other than the first receiving node matches the accepted message received from the first receiving node.

7. The network of claim 1, wherein each of the plurality of nodes is communicatively coupled to a first neighbor node in a first direction via a first direct link, to a second neighbor node in a second direction via a second direct link, to a first neighbor's neighbor node in a first direction via a first skip link, and to a second neighbor's neighbor node in a second direction via a second skip link.

8. The network of claim 5, wherein each of the plurality of nodes is configured to forward only one received copy of the message via the first direct link and only one received copy of the message via the second direct link.

9. The network of claim 1, wherein the plurality of nodes is configured to communicate over the plurality of communication links using Avionics Full-Duplex Switched Ethernet (AFDX), wherein the identification inserted into each copy of the message transmitted from the first transmission node and the second transmission node is at least a portion of a virtual link identification.

10. The network of claim 1, wherein the first transmission node is configured to insert a respective unique identification into each copy of the message transmitted from the first transmission node;
 wherein the second transmission node is configured to insert a respective unique identification into each copy of the message transmitted from the second transmission node;
 wherein each of the plurality of nodes is configured to forward the received copies of the message according to predetermined routing rules based on the respective unique identification of the received copies of the message.

11. A ring network comprising:
 a plurality of nodes, each of the plurality of nodes communicatively coupled to a first neighbor node in a first direction via a first direct link, to a second neighbor node in a second direction via a second direct link, to a first neighbor's neighbor node in a first direction via a first skip link, and to a second neighbor's neighbor node in a second direction via a second skip link;
 wherein a first node and a second node of the plurality of nodes form a transmission pair, each of the first and second nodes configured to transmit simultaneously copies of a message to the other nodes of the plurality of nodes;
 wherein the first node is configured to transmit a first copy of a message having a respective identification (ID) via the first node's respective first direct link, a second copy of the message having a respective ID via the first node's respective first skip link, a third copy of the message having a respective ID via the first node's respective second skip link, and a fourth copy of the message having a respective ID via the first node's respective second direct link;
 wherein the second node is configured to transmit a fifth copy of the message having a respective ID via the second node's respective first direct link, a sixth copy of the message having a respective ID via the second node's respective first skip link, a seventh copy of the message having a respective ID via the second node's respective second skip link, and an eighth copy of the message having a respective ID via the second node's respective second direct link;
 wherein each of the plurality of nodes is configured to forward copies of the message received at the respective node based, at least in part, on the respective ID of each received copy of the message such that each copy of the message traverses a respective predetermined communication path through the ring network;
 wherein each of the plurality of nodes is configured to compare at least one received copy of the message transmitted from the first node with at least one received copy of the message transmitted from the second node;
 wherein each of the plurality of nodes is configured to validate the integrity of the compared copies of the message if the compared copies of the message match and the communication path traversed by the at least one received copy of the message transmitted from the first node is disjoint from the communication path traversed by the at least one received copy of the message transmitted from the second node.

12. The ring network of claim 11, wherein each of the plurality of nodes is further configured to validate the integrity of the compared copies of the message if two received copies of the message transmitted from the first node each match the at least one received copy of the message transmitted from the second node and the two received copies of the message transmitted from the first node traversed respective communication paths that do not overlap.

13. The ring network of claim 11, wherein two of the other nodes not in the transmission pair form a reception pair; each of the nodes in the reception pair configured to validate the integrity of a received copy of the message if the received copy of the message matches a copy of the message whose integrity was validated by the other node in the reception pair.

14. The ring network of claim 11, wherein each of the plurality of nodes is configured to forward only one received copy of the message via the first direct link and only one received copy of the message via the second direct link.

15. The ring network of claim 11, wherein the first node is configured to insert a first ID into each of the first, second, third, and fourth copies of the message;
- wherein the second node is configured to insert a second ID into each of the fifth, sixth, seventh, and eighth copies of the message;
- wherein each of the plurality of nodes is configured to forward copies of the message received at the respective node based on the respective ID of each received copy of the message and on a respective port over which each respective copy of the message is received at the respective node.

16. The ring network of claim 15, wherein each of the plurality of nodes is configured to determine that the compared copies of the message match if an aggregate difference between the compared copies is less than a configured tolerance value.

17. A method of communicating data in a network, the method comprising:
- transmitting a plurality of copies of a message from each of a first transmission node and a second transmission node, each copy having a respective identification;
- forwarding each of the plurality of copies of the message among other nodes in the network based, at least in part, on the respective identification of each copy such that each copy of the message traverses a predetermined communication path among the other nodes;
- comparing, at each of the other nodes, a respective first received copy of the message transmitted from the first transmission node to a respective second received copy of the message transmitted from the second transmission node; and
- validating, at each of the other nodes, the integrity of the respective first and second received copies if the respective first received copy of the message matches the respective second received copy of the message and the respective first received copy traverses a communication path that is disjoint from a communication path traversed by the respective second received copy;
- comparing a respective third received copy of the message to the respective first and second received copies of the message if the communication path of the respective first received copy is not disjoint from the communication path of the respective second received copy, the respective third received copy of the message transmitted from one of the first transmitting node or the second transmitting node; and
- validating the integrity of the respective first and second received copies if the respective first and second received copies match the respective third received copy and a respective communication path of the third received copy does not overlap both the respective communication path of the first received copy and the respective communication path of the second received copy.

18. The method of claim 17, further comprising:
- validating the integrity of at least one of the respective first and second received copies of the message if at least one of the respective first and second copies matches a validated copy of the message received from an adjacent node, the integrity of the validated copy having been validated by the adjacent node.

19. The method of claim 17, wherein transmitting the plurality of copies of the message from each of the first transmission node and the second transmission node comprises transmitting the plurality of copies using an Ethernet-based protocol.

* * * * *